(12) United States Patent  
Wang (10) Patent No.: US 10,157,219 B2  
(45) Date of Patent: Dec. 18, 2018

(54) GEOGRAPHICAL MAP-BASED VISUALIZATION OF BIG DATA

(71) Applicant: Dalian University of Technology, Dalian (CN)

(72) Inventor: Xingyuan Wang, Dalian (CN)

(73) Assignee: Dalian University of Technology, Dalian (CN)

( * ) Notice: Subject to any disclaimer, the term of this patent is extended or adjusted under 35 U.S.C. 154(b) by 419 days.

(21) Appl. No.: 14/891,386

(22) PCT Filed: Nov. 10, 2014

(86) PCT No.: PCT/CN2014/090706  
§ 371 (c)(1),  
(2) Date: Nov. 16, 2015

(87) PCT Pub. No.: WO2016/074125  
PCT Pub. Date: May 19, 2016

(65) Prior Publication Data  
US 2016/0267171 A1   Sep. 15, 2016

(51) Int. Cl.  
G06F 17/30   (2006.01)

(52) U.S. Cl.  
CPC .. G06F 17/30601 (2013.01); G06F 17/30327 (2013.01); G06F 17/30486 (2013.01); G06F 17/30572 (2013.01)

(58) Field of Classification Search  
CPC ..................... G06F 17/30601; G06T 17/20  
See application file for complete search history.

(56) References Cited

U.S. PATENT DOCUMENTS

| | | | |
|---|---|---|---|
| 6,092,072 A * | 7/2000 | Guha | G06F 17/30598 707/700 |
| 7,996,390 B2 | 8/2011 | Freire et al. | |
| 8,711,181 B1 * | 4/2014 | Nourse | G06F 3/14 345/660 |
| 9,336,302 B1 * | 5/2016 | Swamy | G06F 17/3071 |
| RE46,651 E * | 12/2017 | Holbrook | G06F 17/30864 |

(Continued)

FOREIGN PATENT DOCUMENTS

| | | |
|---|---|---|
| CN | 101706778 A | 5/2010 |
| CN | 103150454 A | 6/2013 |

OTHER PUBLICATIONS

Biuk-Aghai, Robert P. and AO, Wai Hai, "A novel map-based visualization method based on liquid modelling," Proceedings of the 6th International Symposium on Visual Information Communication and Interaction, pp. 97-104, 2013.

(Continued)

*Primary Examiner* — Usmaan Saeed  
*Assistant Examiner* — David M Nafziger (57) ABSTRACT

Embodiments pertaining to techniques of geographical map-based visualization of big data are provided. In one aspect, a random sampling of a dataset may be divided into a plurality of partitions. Each partition of the plurality of partitions may be clustered to provide a plurality of data blocks, each of which may comprise a respective plurality of data items. A respective one or more representative points may be extracted from each data block of the plurality of data blocks to represent the respective data block. The respective one or more representative points for each of the data blocks may then be displayed.

25 Claims, 8 Drawing Sheets

(56) References Cited

U.S. PATENT DOCUMENTS

| | | | |
|---|---|---|---|
| 2006/0271533 A1* | 11/2006 | Sakurai | G06F 17/30705 |
| 2009/0300547 A1 | 12/2009 | Bates et al. | |
| 2011/0295567 A1 | 12/2011 | Thiesson et al. | |
| 2013/0321446 A1* | 12/2013 | Cutcher-Gershenfeld | G06T 11/206 |
| | | | 345/589 |
| 2014/0006403 A1 | 1/2014 | King et al. | |
| 2014/0304033 A1* | 10/2014 | Cardno | G06F 17/30572 |
| | | | 705/7.29 |
| 2015/0019569 A1* | 1/2015 | Parker | G06F 17/30572 |
| | | | 707/748 |
| 2015/0205506 A1* | 7/2015 | Hansen | G06F 3/04847 |
| | | | 715/771 |
| 2017/0134226 A1* | 5/2017 | Ilic | H04L 41/0816 |

OTHER PUBLICATIONS

Guha, Sudipto et al., "CURE: An Efficient clustering algorithm for large databases," SIGMOD '98 Proceedings of the 1998 ACM SIGMOD international conference on Management of data, pp. 73-84, 1998.

International Search report and written opinion dated Jul. 28, 2015 for PCT Application No. PCT/CN2014/090706.

Jian, Z., et al., "The Clustering Algorithm using Multi-Deputies," Proceedings of the 3rd National conference on Information retrieval and content security, pp. 204-208 (Dec. 31, 2007) (English Abstract).

Kamada T. and Kawai S., "An algorithm for drawing general undirected graphs," Information processing letters, vol. 31, Issue 1, pp. 7-15, (Apr. 12, 1989).

Mladenic Dunja and Grobelnik Marko, "Visualizing Very Large Graphs Using Clustering Neighborhoods," LPD'04 Proceedings of the 2004 International conference on Local Pattern Detection, pp. 89-97, 2005.

Slingsby, A. et al., "Exploring uncertainty in geodemographics with interactive graphics," IEEE Transactions on Visualization and Computer Graphics, vol. 17, Issue 12, pp. 2545-2554, 2011.

* cited by examiner

GEOGRAPHICAL MAP-BASED VISUALIZATION OF BIG DATA

CROSS-REFERENCE TO RELATED APPLICATION

This Application is the National Stage filing under 35 U.S.C. § 371 of PCT Application Ser. No. PCT/CN2014/090706 filed on Nov. 10, 2014. The disclosure of the PCT Application is hereby incorporated herein by reference in its entirety.

TECHNICAL FIELD

The embodiments described herein pertain generally to visualization of big data and, more particularly, to geographical map-based visualization of big data.

BACKGROUND

Unless otherwise indicated herein, the approaches described in this section are not prior art to the claims in this application and are not admitted to be prior art by inclusion in this section.

In the networked society of present day, large amounts of data is being generated at any given moment. For example, social networks, collaborative filtering of online discussion, user comments and others, with millions of clients, generate huge amounts of data, or so-called big data. When such big data is processed by a traditional visualization technique, often times the results are less than desirable and cannot be obtained as expected.

SUMMARY

In one example embodiment, a method may include: performing, by one or more processors of one or more servers, a random sampling of a dataset to obtain a sample representative of the dataset; dividing, by the one or more processors, the sample into a plurality of partitions; clustering, by the one or more processors, each partition of the plurality of partitions to provide a plurality of data blocks each of which comprising a respective plurality of data items; extracting, by the one or more processors, respective one or more representative points from each data block of the plurality of data blocks to represent the respective data block; and displaying the respective one or more representative points for each of the data blocks.

In another embodiment, a computer-readable storage medium having stored thereon computer-executable instructions executable by one or more processors to perform operations including: performing operations related to clustering on a random sampling of a dataset; and displaying results of the performed operations as a geographical map-based visualization of the dataset.

In yet another example embodiment, an apparatus may include memory configured to store one or more instructions and one or more processors coupled to the memory. The one or more processors may be configured to execute the one or more instructions to perform operations including: performing a random sampling of a dataset to obtain a sample representative of the dataset; dividing the sample into a plurality of partitions; clustering each partition of the plurality of partitions to provide a plurality of data blocks each of which comprising a respective plurality of data items; extracting respective one or more representative points from each data block of the plurality of data blocks to represent the respective data block; and displaying the respective one or more representative points for each of the data blocks as a geographical map-based visualization of the dataset.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

According to the present disclosure, data size processed at each time is firstly reduced, and a CURE clustering method is employed to divide the data into several relatively concentrated parts. Each of these parts alone is regarded as a data block. Each data block is visualized after an analysis of the size and degree of importance of the data block, and further clustering and visualization of the details of each data block can be performed. When an appropriate size for a given data block is obtained, the clustering thereof is discontinued and the particular data block is directly visualized. Visualization herein refers to correlating the data size and degree of importance to information of locations and colors of color blocks on a map.

The present disclosure provides a technique of geographical map-based visualization of big data that is easy for users to understand. Embodiments of the present disclosure may be employed for, for example, displaying global knowledge of data. Embodiments of the present disclosure may utilize the Clustering Using Representatives (CURE) data clustering algorithm. Major steps involved in the clustering may include the following: (1) a random sampling of a dataset is performed to obtain a sample S representative of the dataset; (2) the sample S is divided into q partitions, each in size $|S|/q$; (3) clustering of each partition of the q partitions is performed (e.g., batch clustering may speed up the process); (4) isolated points and those partitions for which clustering is relatively slow (as it is likely that such a partition may contain isolated points) are removed; and (5) for each cluster c representative points are extracted to represent the respective data block (the c points may be randomly selected in the cluster and, through a user-defined contraction factor $\sigma$, are made to contract toward a centroid). The dataset is classified after comparison with ck points, where $k \leq q$.

A user-defined threshold D may be used for the minimum data size necessary to be contained in a given data block for display. Better visualization effect may be achieved if a user decides the degree of granularity of visualization according to the size of data to be visualized. Additionally, the user may also set the number of layers of visualization, K. If not, a default of three layers may be set, corresponding to the concept of country, provide/state and city, respectively, on the map.

After the initial setting, a given dataset is clustered using the CURE data clustering algorithm to provide plural data blocks. The result of clustering may be treated as a first layer of nods connected to a root node, with the root node being the map per se. Each node records the size d of the data contained therein. Nodes for which d<D are not divided into sub-blocks. Similarly, nodes on layer K+1 will not be divided into sub-blocks. Clustering is continued for the remaining nodes, e.g., using the CURE data clustering algorithm, until none of the remaining nodes can be further divided/partitioned.

On one hand, the amount of data contained in a node decreases (as data with low degree of association is removed) as the number of layers increases, and the degree of closeness between the data increases. On the other hand, for different layers, there may be different user requirements on the maximum number of sibling nodes that belong to the same parent node. Accordingly, a number of modifications as described below are necessary during the CURE clustering of data in each node.

Firstly, the degree of closeness of each data item to other data items in a node i is recorded, and a clustering threshold T(i) is determined. When determining whether two data items belong to the same type, a comparison of the degree of closeness between the two data items and the threshold T(i) is performed.

Secondly, a threshold C may be set successively for each layer (not including the layer of the root node) of K layers, based on the number of layers, K, present by the user. The maximum number of sibling nodes belonging to the same parent node is limited by the threshold C. For example, C may be set to be 5, as generally a person can visually remember up to most five modules at a time.

Figure 1:
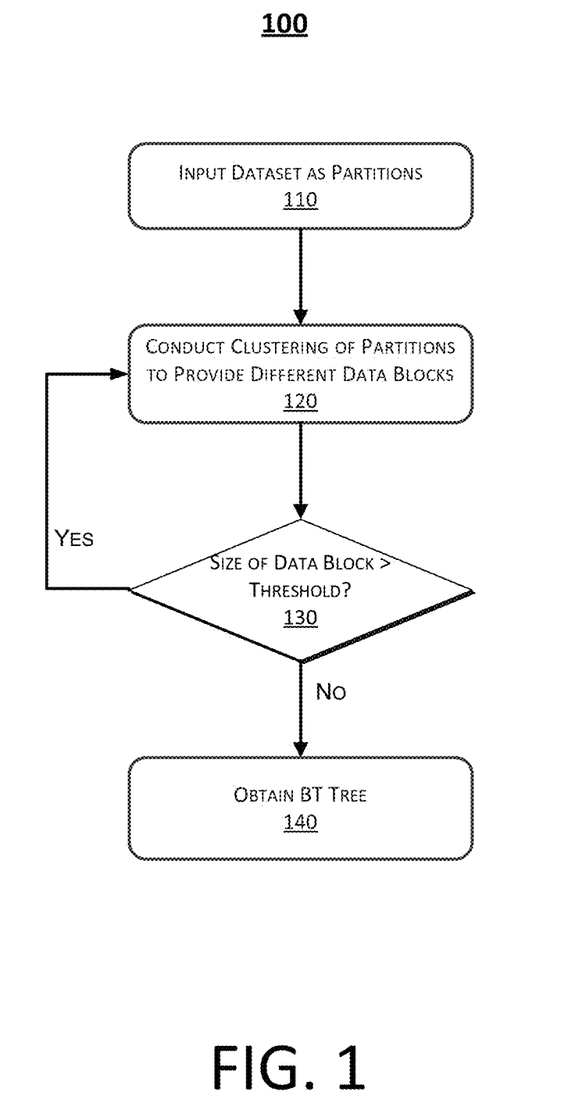
FIG. 1 shows an example process of constructing a tree for geographical map-based visualization of big data in accordance with at least some embodiments of the present disclosure.
Figure 2:
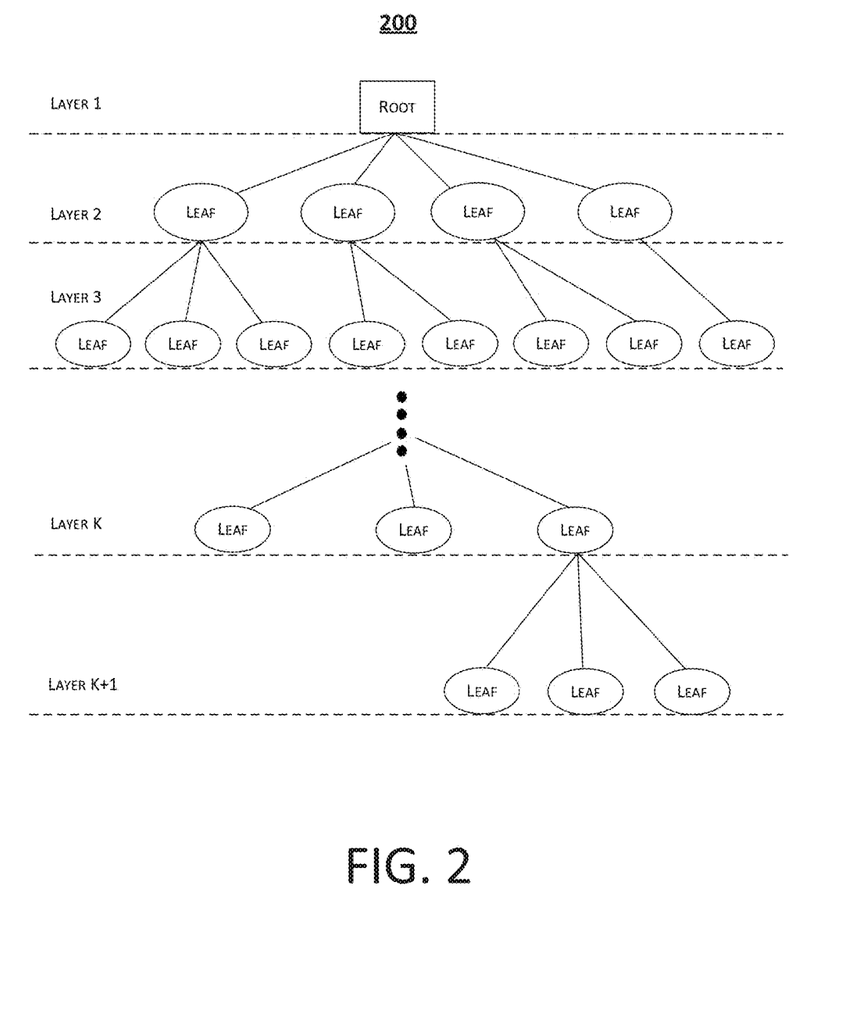
FIG. 2 shows an example tree for geographical map-based visualization of big data in accordance with at least some embodiments of the present disclosure.

FIG. 1 shows an example process 100 of constructing a tree for geographical map-based visualization of big data in accordance with at least some embodiments of the present disclosure. FIG. 2 shows an example tree 200 for geographical map-based visualization of big data in accordance with at least some embodiments of the present disclosure.

Through the process 100 illustrated in FIG. 1, tree 200 (hereinafter interchangeably referred to as "BT tree") as that shown in FIG. 2 is obtained. Each node in tree 200 is the sum of data in its child nodes. The data intersection between sibling nodes is null, with the root node containing all data. Nodes of tree 200 is the object of visualization according to the present disclosure.

For example, according to process 100, at 110 a dataset, e.g., big data, is inputted as a number of partitions. Then, at 120, clustering is conducted on the numerous partitions to provide different data blocks. At 130, for each data block process 100 determines whether the size of the data block is greater than a threshold. If the size of a given data block is greater than the threshold, the process 100 repeats the operation of clustering on the data block; otherwise, process 100 proceeds 140 to construct a BT tree, e.g., tree 200 of FIG. 2.

Suppose the total number of data items is N and, by default, if each node has one or more child nodes the number of child nodes may be equivalent to or greater than 2. Otherwise, the data contained in a child node would be the data contained in the node per se, and the two nodes are equivalent to one node. Thus, the total number of nodes is less than 2N/D. As the concern is the global knowledge of data, it is highly likely that D may be at least a thousandth order of magnitude of N. Generally, D on a hundredth order of magnitude of N would be adequate enough to display the data information as a whole. As a result, the big data problem will not need to be considered in visualization of tree 200.

Figure 3:
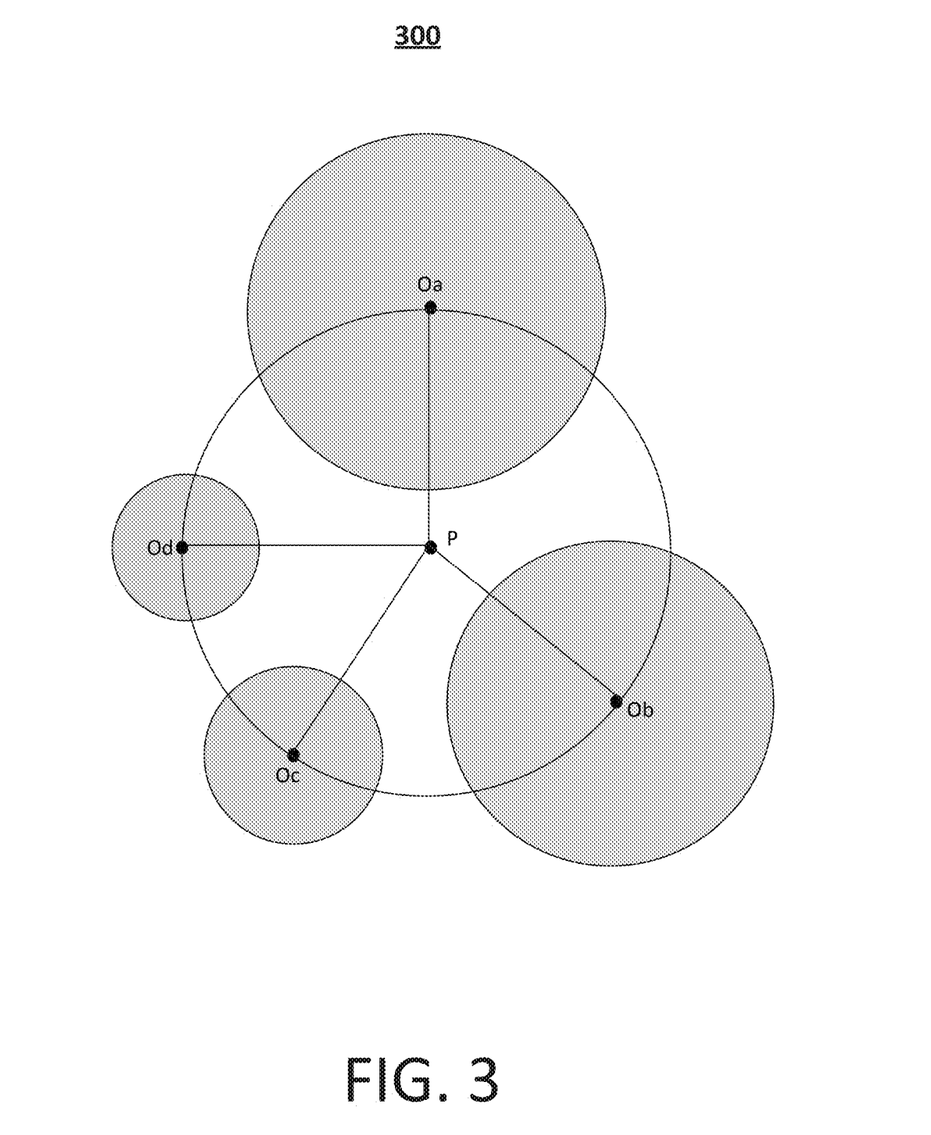
FIG. 3 shows an example layout of child nodes of a given node for geographical map-based visualization of big data in accordance with at least some embodiments of the present disclosure.

FIG. 3 shows an example layout 300 of child nodes of a given node for geographical map-based visualization of big data in accordance with at least some embodiments of the present disclosure. With tree 200 constructed, a map may be planned accordingly. Referring to FIG. 2 and FIG. 3, layer 1, where the root node resides, may be considered as the top layer and layer K+1 may be considered as the bottom layer of tree 200. Beginning from the bottom layer, each child node of the child nodes belonging to the same parent node is correlated to a respective circle according to the size of the node (amount of data contained therein), where the size of the node is directly proportional to the area of the respective circle. The resultant circles are connected to a point P and evenly distributed around the point P.

For example, as shown in FIG. 3, a given layer may have four child nodes corresponding to circles Oa, Ob, Oc and Od. The center of each circle is connected to a point P as nodes corresponding to circles Oa, Ob, Oc and Od are associated with the same parent node. The sizes of circles Oa, Ob, Oc and Od are different as the data size of the corresponding child nodes are different.

The lines connecting the point P with the circles are simultaneously contracted to the effect that the distance between circles equals δ, with certain space maintained for the convenience of subsequent expansion. The new graph obtained may be used as the graph of the parent node with the point P being equivalent to the center of the graph. The nodes of the bottom layer are processed accordingly as described above. For nodes on layer K, if there is no child node, the corresponding graph may be a circle obtained according to its data size. Alternatively, if there are child nodes, the corresponding graph may be obtained according to the aforementioned process. That is, nodes on layer K may be processed the same as for nodes on layer K+1. This process continues until the graph corresponding to the root node is obtained, which is set as BTG, according to an example process 400 shown in FIG. 4.

Figure 4:
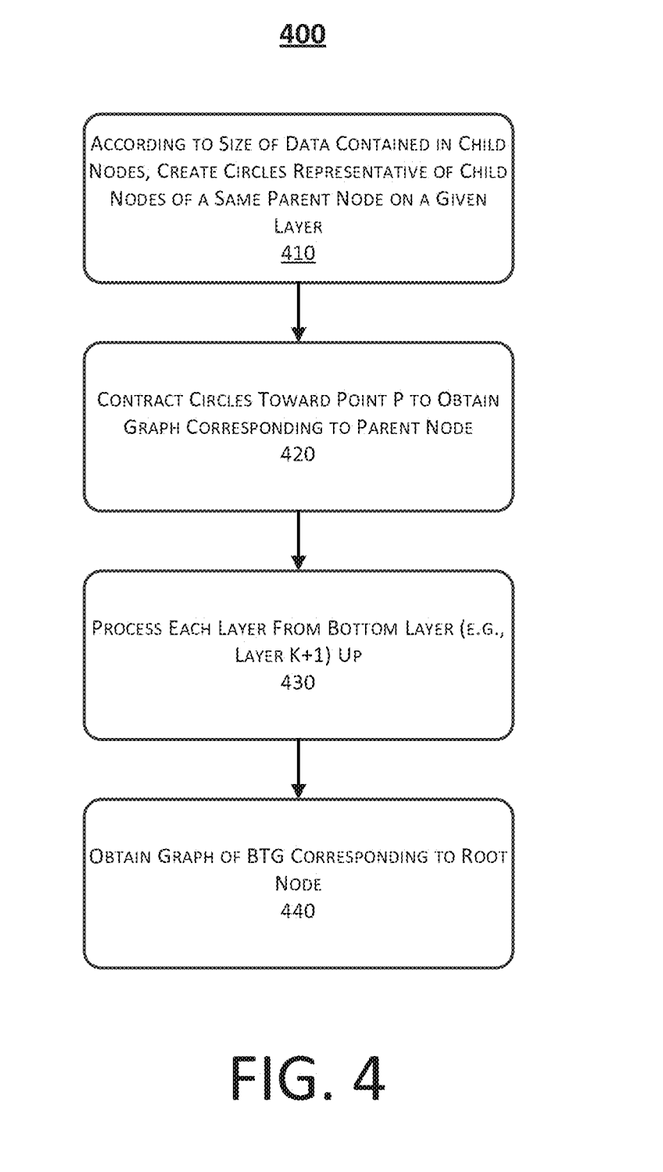
FIG. 4 shows an example process of obtaining a graphical representation of a root node of a tree for geographical map-based visualization of big data in accordance with at least some embodiments of the present disclosure.

FIG. 4 shows an example process 400 of obtaining a graphical representation of a root node of a tree for geographical map-based visualization of big data in accordance with at least some embodiments of the present disclosure. The above-described process continues until the graph corresponding to the root node is obtained, which is interchangeably referred to as BTG hereinafter, according to example process 400 shown in FIG. 4.

For example, at 410, process 400 creates circles representative of child nodes of the same parent node on a given layer according to the size of data contained in each child node. An example is shown in FIG. 3. At 420, process 400 contracts the circles toward point P to obtain a graph corresponding to the parent node of those child nodes. At 430, process 400 repeats the same for each layer of the K+1 layers from the bottom layer, e.g., layer K+1, up. At 440, process 400 obtains a graph of BTG corresponding to the root node.

Next, pre-processing of BTG is conducted. In some embodiments, the graph is a set of circles in different sizes. However, nodes represented by different circles are not all on layer K+1 and, therefore, a distinction among the circles is necessary. Different circles are marked with respective layer numbers on their boundary, for example, according to the layers on which the corresponding nodes of the circles are located. The plane on which BTG is located, which is generally rectangular, is normalized according to the graph. Each circle in the graph is corresponded to a two-dimensional normal distribution with parts being inside the circle, and the product of this two-dimensional normal distribution may be 0.5, where minor adjustment may be made according to different requirements. In light of symmetry of circles, this two-dimensional normal distribution is also symmetrical. Thus, a normal graph may be obtained by overlaying these two-dimensional normal distributions of the circles.

In some embodiments, a contour map may be constructed based on the normal graph. The boundaries of the circles in the BTG graph may be expanded outwards, and the speed of the outward expansion of a given circle may be determined by the height of the contour map on which the boundary of the circle is located. For example, the greater the height the higher the speed may be. When boundaries of different circles collide with one another, the colliding part may stop expanding, and the mark on the colliding line may be set as the layer number of the first ancestor shared by the nodes corresponding to the original two parts.

In view of the computational complexity in performing the above-described operations, in some embodiments the circles may be approximated by approximate centagons or other polygons. The expansion of the boundary of a circle may be equivalent to the process of vertexes of a centagon successively moving outwards, with edges of the centagon moving with vertexes. Accordingly, not only the amount of computation may be significantly reduced, but the problem of different parts of the boundary of circles being marked differently may also be solved.

Using centagons as an example, for the same centagon, an edge between two vertexes is separated from other edges of the centagon, and the edges of the centagon are equal in length at the beginning but may vary without impacting other edges when colliding with one or more edges of one or more other centagons. In addition, with respect to the speed of expansion of different parts of the boundary may also be transferred to vertexes of the centagon. The speed of expansion may be determined with mere consideration of the height of the location of the vertex on the contour map.

Accordingly, the condition for discontinuing expansion may be determined. For example, as all vertexes of the centagons expand outwards, the number of collision among the centagons increases sharply before it begins to decreases steadily. In addition, the number of collision at "higher locations" on the contour map may reduce relatively more rapidly. Thus, a condition may be set so as to enable the expansion process to stop at a proper time. Otherwise, the expansion process may result in the centagons filling up the entire screen, and this does not comply with the requirement of geographical map-based visualization. Besides, this may also cause relative distortion of size of peripheral graphs.

Figure 5:
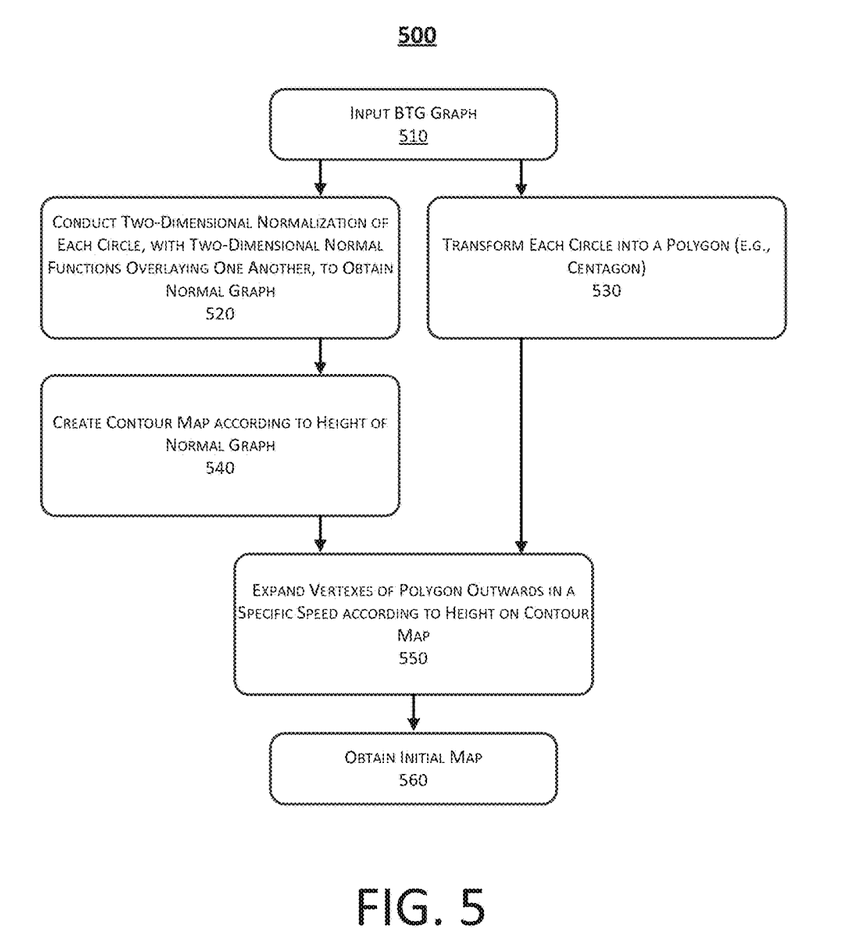
FIG. 5 shows an example process of obtaining an initial map for geographical map-based visualization of big data in accordance with at least some embodiments of the present disclosure.

FIG. 5 shows an example process 500 of obtaining an initial map for geographical map-based visualization of big data in accordance with at least some embodiments of the present disclosure. An initial map may be obtained pursuant to example process 500. According to the marked value on the boundary of the circles (or centagons), boundaries may be classified and redrawn. Additionally, boundaries may be colored according to the size of areas demarcated by the boundaries as well as any other user requirements. Thus, a complete geographical map-based visualization of big data may be obtained.

For example, at 510, process 500 takes the BTG graph as the input. At 520, process 500 conducts two-dimensional normalization of each circle on each layer, with two-dimensional normal functions overlaying one another, to obtain a normal graph. At 530, process 500 transforms each circle into a polygon, e.g., a centagon. At 540, process 500 creates a contour map according to the height of the normal graph. At 550, process 500 expands the vertexes of the polygons outwards in a specific speed, which may be user-defined, according to the height of the respective vertex on the contour map. At 560, process 500 obtains an initial map to provide geographical map-based visualization of the dataset.

In summary, while traditional visualization techniques may achieve better display effects when dealing with a small amount of data, they may not be able to process, or provide expected results, when dealing with big data, e.g., with mega-scale data as the threshold. In comparison, embodiments of the present disclosure provide a number of advantages. Firstly, embodiments of the present disclosure enable visualization tools with the ability to process big data using the CURE data clustering algorithm with reduced requirement on the host. Secondly, embodiments of the present disclosure enable processing of data by map-based visualization with the data as a whole well displayed. Additionally, embodiments of the present disclosure utilize a contour map to control the speed of expansion of graphs, e.g., circles, centagons or polygons, at different parts, thus avoiding distortion of the final displayed map. Moreover, compared to other visualization techniques, requirement on users imposed by embodiments of the present disclosure is greatly reduced.

Example Implementations

Figure 6:
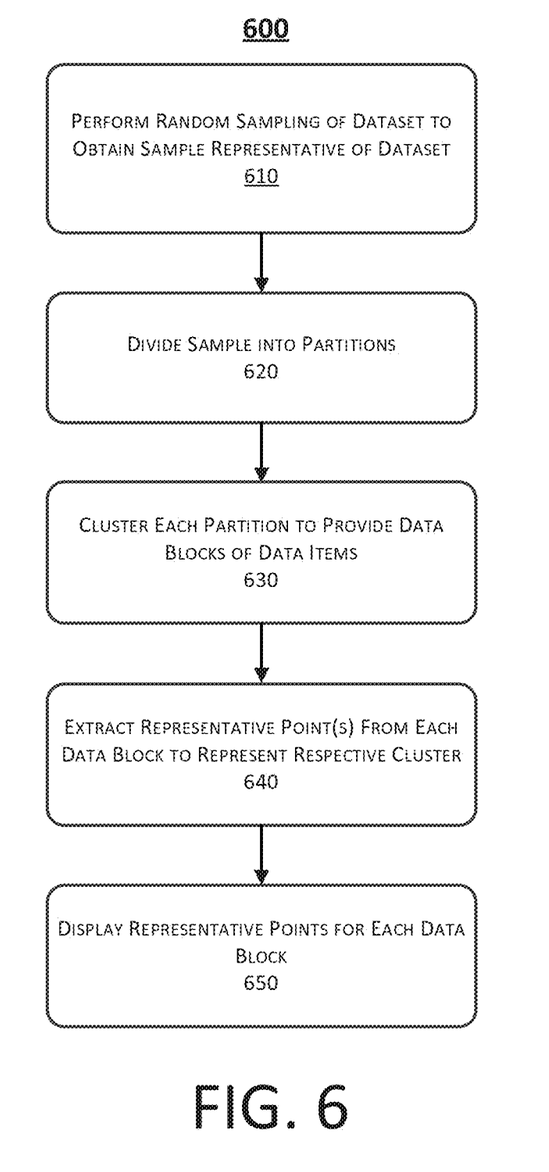
FIG. 6 shows an example processing flow of geographical map-based visualization of big data in accordance with at least some embodiments of the present disclosure.
Figure 8:
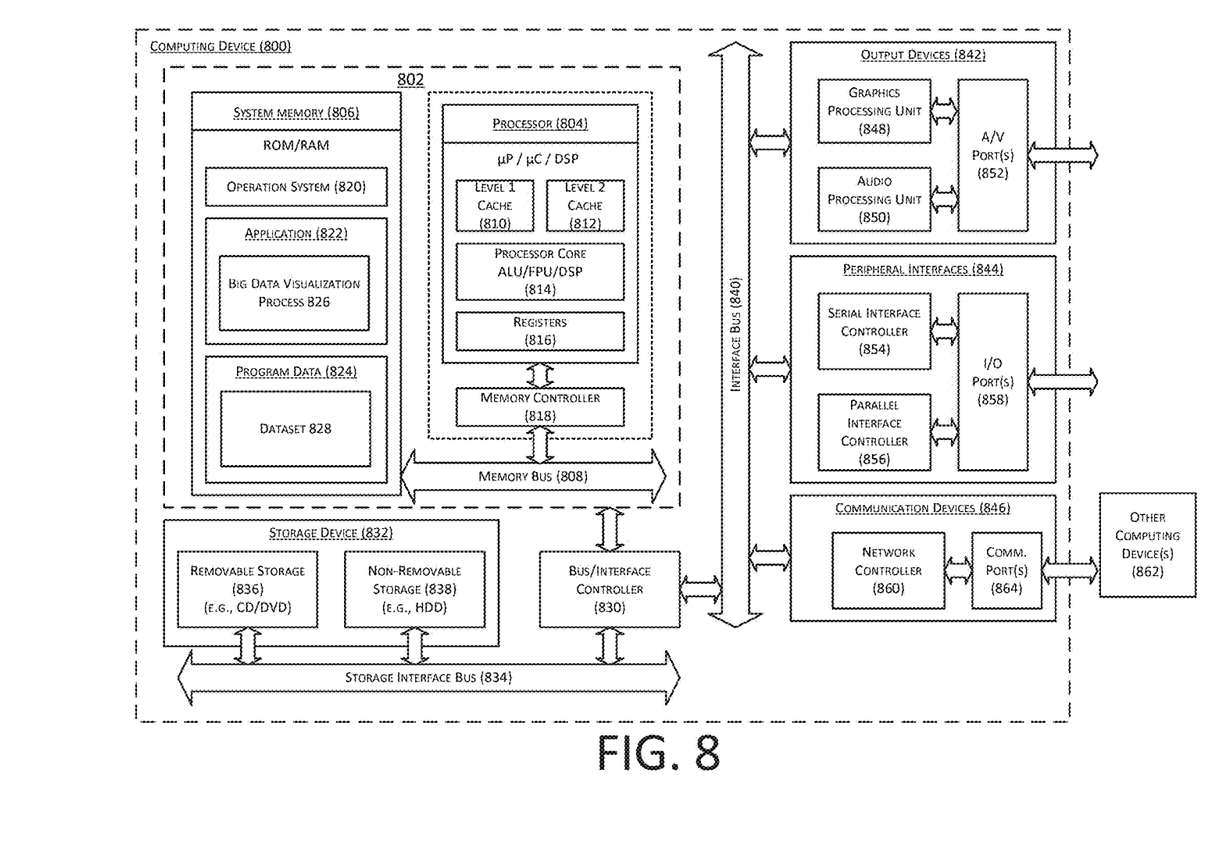
FIG. 8 shows an example apparatus configured to implement geographical map-based visualization of big data in accordance with at least some embodiments of the present disclosure.

FIG. 6 shows an example process 600 of geographical map-based visualization of big data in accordance with at least some embodiments of the present disclosure. Processing flow 600 may be implemented in apparatus 800 as described below. Further, processing flow 600 may include one or more operations, actions, or functions depicted by one or more blocks 610, 620, 630, 640 and 650. Although illustrated as discrete blocks, various blocks may be divided into additional blocks, combined into fewer blocks, or eliminated, depending on the desired implementation. Processing flow 600 may begin at block 610.

At 610 (Perform Random Sampling of Dataset to Obtain Sample Representative of Dataset) may refer to one or more processors of one or more servers, e.g., apparatus 800, performing a random sampling of a dataset, e.g., big data, to obtain a sample that is representative of the dataset.

At 620 (Divide Sample into Partitions) may refer to the one or more processors dividing the sample into a plurality of partitions.

At 630 (Cluster Each Partition to Provide Data Blocks of Data Items) may refer to the one or more processors clustering each partition of the plurality of partitions to provide a plurality of data blocks, with each data block containing a respective plurality of data items.

At 640 (Extract Representative Point(s) From Each Data Block to Represent Respective Cluster) may refer to the one or more processors extracting respective one or more representative points from each data block of the plurality of data blocks to represent the respective data block.

At 650 (Display Representative Points for Each Data Block) may refer to the one or more processors displaying, or causing a display or output device to display, the respective one or more representative points for each of the data blocks.

In at least some embodiments, in clustering, processing flow 600 may involve the one or more processors clustering using the CURE data clustering algorithm.

In at least some embodiments, in clustering, processing flow 600 may involve the one or more processors establishing a tree data structure having a plurality of hierarchical layers each having one or more nodes. Each node may have zero or more child node, and each node may contain a sum of data items of the respective zero or more child node thereof.

In at least some embodiments, in displaying, processing flow 600 may involve the one or more processors performing operations including: generating a graphical representation of the tree data structure, with the graphical representation including one or more circles for the one or more nodes of each layer of the plurality of hierarchical layers; generating a normal graph, using the graphical representation of the tree data structure, by conducting two-dimensional normalization of each circle, with each circle corresponding to a respective two-dimensional distribution of data overlaying one or more two-dimensional distributions of data of one or more other circles; generating a contour map according to a height of the normal graph; and generating a geographical map-based visualization of the dataset. In at least some embodiments, processing flow 600 may additionally include transforming each circle into a polygon of one hundred sides, vertexes of each polygon expanding outward in a specific speed according to a height of the respective polygon on the contour map.

In at least some embodiments, in displaying, processing flow 600 may involve the one or more processors performing operations including: receiving a user input indicative of a number of layers of visualization; and displaying the respective one or more representative points for each of the data blocks in the number of layers according to the user input.

In at least some embodiments, in displaying, processing flow 600 may involve the one or more processors displaying the respective one or more representative points for each of the data blocks in a default number of layers.

In at least some embodiments, in displaying, processing flow 600 may involve the one or more processors displaying the respective one or more representative points for each of the data blocks as a geographical map-based visualization of the dataset.

In at least some embodiments, processing flow 600 may further involve the one or more processors performing operations including: determining, for each data item of each data block of the plurality of data blocks, a degree of closeness between the each data item and other data items of the respective data block; determining a clustering threshold based at least in part on the degrees of closeness between the data items of a given data block for at least one data block of the plurality of data blocks; and determining, for at least two data items of the at least one data block, whether the at least two data items belong to a same class or different classes of data based at least in part on the clustering threshold.

In at least some embodiments, processing flow 600 may further involve the one or more processors receiving a user input indicative of a minimum threshold of a size of an amount of data contained in each of the data blocks for visualization.

Figure 7:
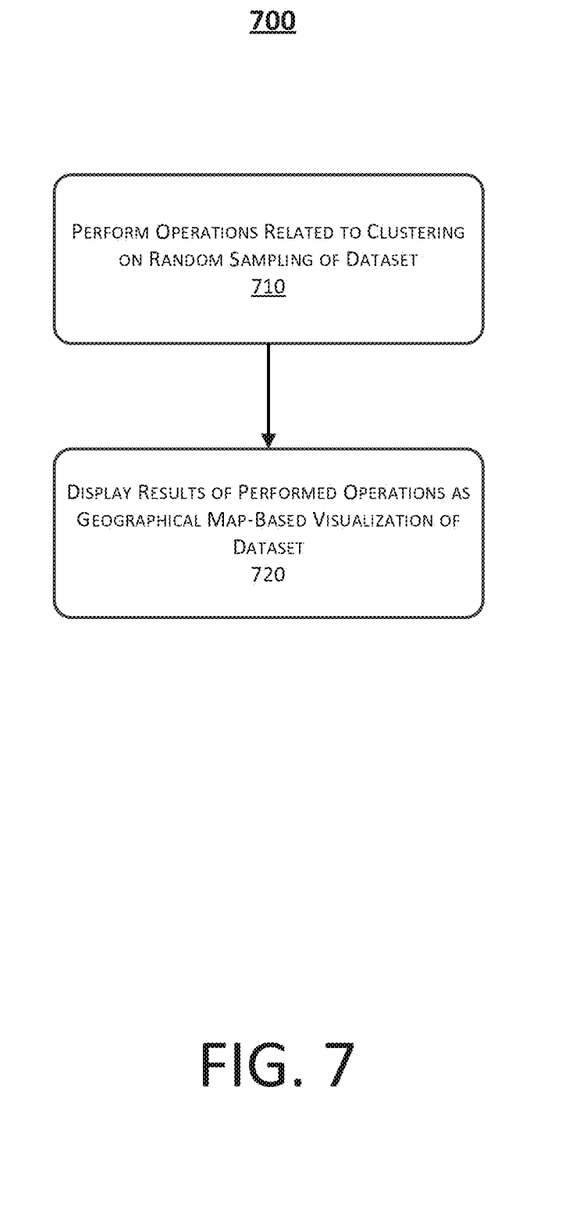
FIG. 7 shows another example processing flow of geographical map-based visualization of big data in accordance with at least some embodiments of the present disclosure.

FIG. 7 shows another example process 700 of geographical map-based visualization of big data in accordance with at least some embodiments of the present disclosure. Processing flow 700 may be implemented in apparatus 600 as described below. Further, processing flow 700 may include one or more operations, actions, or functions depicted by one or more blocks 710 and 720. Although illustrated as discrete blocks, various blocks may be divided into additional blocks, combined into fewer blocks, or eliminated, depending on the desired implementation. Processing flow 700 may begin at block 710.

At 710 (Perform Operations Related to Clustering on Random Sampling of Dataset) may refer to one or more processors of one or more servers, e.g., apparatus 800, performing operations related to clustering on a random sampling of a dataset, e.g., big data.

At 720 (Display Results of Performed Operations as Geographical Map-Based Visualization of Dataset) may refer to the one or more processors displaying, or causing a display or output device to display, results of the performed operations as a geographical map-based visualization of the dataset.

In at least some embodiments, in performing operations related to clustering, processing flow 700 may involve the one or more processors performing operations including: performing the random sampling of the dataset to obtain a sample representative of the dataset; dividing the sample into a plurality of partitions; clustering each partition of the plurality of partitions to provide a plurality of data blocks each of which comprising a respective plurality of data items; and extracting respective one or more representative points from each data block of the plurality of data blocks to represent the respective data block. Moreover, in displaying, the one or more processors may display the respective one or more representative points for each of the data blocks.

In at least some embodiments, in clustering, processing flow 700 may involve the one or more processors clustering using the CURE data clustering algorithm.

In at least some embodiments, in clustering, processing flow 700 may involve the one or more processors establishing a tree data structure having a plurality of hierarchical layers each having one or more nodes. Each node may have zero or more child node, and each node may contain a sum of data items of the respective zero or more child node thereof.

In at least some embodiments, in displaying, processing flow 700 may involve the one or more processors performing operations including: generating a graphical representation of the tree data structure, with the graphical representation including one or more circles for the one or more nodes of each layer of the plurality of hierarchical layers; generating a normal graph, using the graphical representation of the tree data structure, by conducting two-dimensional normalization of each circle, each circle corresponding to a respective two-dimensional distribution of data overlaying one or more two-dimensional distributions of data of one or more other circles; generating a contour map according to a height of the normal graph; transforming each circle into a polygon of one hundred sides, with vertexes of each polygon expanding outward in a specific speed according to a height of the respective polygon on the contour map; and generating the geographical map-based visualization of the dataset.

In at least some embodiments, in displaying, processing flow 700 may involve the one or more processors performing operations including: receiving a user input indicative of a number of layers of visualization; and displaying the respective one or more representative points for each of the data blocks in the number of layers according to the user input.

In at least some embodiments, in displaying, processing flow 700 may involve the one or more processors displaying the respective one or more representative points for each of the data blocks in a default number of layers.

In at least some embodiments, in displaying, processing flow 700 may involve the one or more processors displaying the respective one or more representative points for each of the data blocks as a geographical map-based visualization.

In at least some embodiments, in displaying, processing flow 700 may involve the one or more processors performing operations including: determining, for each data item of each data block of the plurality of data blocks, with a degree of closeness between the each data item and other data items of the respective data block; determining a clustering threshold based at least in part on the degrees of closeness between the data items of a given data block for at least one data block of the plurality of data blocks; and determining, for at least two data items of the at least one data block, whether the at least two data items belong to a same class or different classes of data based at least in part on the clustering threshold.

In at least some embodiments, in displaying, processing flow 700 may involve the one or more processors receiving a user input indicative of a minimum threshold of a size of an amount of data contained in each of the data blocks for visualization.

FIG. 8 shows an example apparatus 800 configured to implement geographical map-based visualization of big data in accordance with at least some embodiments of the present disclosure.

In a very basic configuration 802, computing device 800 typically includes one or more processors 804 and a system memory 806. A memory bus 808 may be used for communicating between processor 804 and system memory 806. This described basic configuration 802 is illustrated in FIG. 8 by those components within the inner dashed line.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a big data visualization process 826 that is arranged to perform the functions as described herein including those described with respect to processing flow 600 of FIG. 6 and/or processing flow 700 of FIG. 7, as well as those pertaining to FIGS. 1-5. Program data 824 may include dataset 828 that may be useful for operation with visualization process 826 as described herein.

In some embodiments, processor 804 may execute application 822 to operate with program data 824 on operating system 820 to performing operations including: performing a random sampling of a dataset to obtain a sample representative of the dataset; dividing the sample into a plurality of partitions; clustering each partition of the plurality of partitions to provide a plurality of data blocks each of which comprising a respective plurality of data items; extracting respective one or more representative points from each data block of the plurality of data blocks to represent the respective data block; and displaying the respective one or more representative points for each of the data blocks as a geographical map-based visualization of the dataset.

In at least some embodiments, processor 804 may cluster by clustering using the CURE data clustering algorithm.

In at least some embodiments, processor 804 may cluster by establishing a tree data structure having a plurality of hierarchical layers each having one or more nodes. Each node may have zero or more child node, and each node may contain a sum of data items of the respective zero or more child node thereof.

In at least some embodiments, processor 804 may display by performing operations including: generating a graphical representation of the tree data structure, with the graphical representation including one or more circles for the one or more nodes of each layer of the plurality of hierarchical layers; generating a normal graph, using the graphical representation of the tree data structure, by conducting two-dimensional normalization of each circle, with each circle corresponding to a respective two-dimensional distribution of data overlaying one or more two-dimensional distributions of data of one or more other circles; generating a contour map according to a height of the normal graph; transforming each circle into a polygon of one hundred sides, with vertexes of each polygon expanding outward in a specific speed according to a height of the respective polygon on the contour map; and generating a geographical map-based visualization of the dataset.

In at least some embodiments, processor 804 may display by displaying the respective one or more representative points for each of the data blocks in a default number of layers or in a user-specified number of layers.

In at least some embodiments, processor 804 may additional perform operations including: determining, for each data item of each data block of the plurality of data blocks, with a degree of closeness between the each data item and other data items of the respective data block; determining a clustering threshold based at least in part on the degrees of closeness between the data items of a given data block for at least one data block of the plurality of data blocks; determining, for at least two data items of the at least one data block, whether the at least two data items belong to a same class or different classes of data based at least in part on the clustering threshold; and receiving a user input indicative of a minimum threshold of a size of an amount of data contained in each of the data blocks for visualization.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. Computing device 800 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
    performing, by one or more processors of one or more servers, a random sampling of a dataset to obtain a sample representative of the dataset;
    dividing, by the one or more processors, the sample into a plurality of partitions;
    clustering, by the one or more processors, each partition of the plurality of partitions to provide a plurality of data blocks, wherein each of the plurality of data blocks comprises a respective plurality of data items, and wherein the clustering comprises establishing a tree data structure having a plurality of hierarchical layers;
    extracting, by the one or more processor, respective one or more representative points from each data block of the plurality of data blocks to represent the respective data blocks; and
    displaying the respective one or more representative points for each of the data blocks, wherein the displaying comprises:
        generating, by the one or more processor, a normal graph using a graphical representation of the tree data structure, by conducting two-dimensional normalization of one or more circles in the graphical representation;
        generating, by the one or more processor, a contour map corresponding to a height of the normal graph;
        transforming, by the one or more processor, each circle of the one or more circles into a polygon of one hundred sides, wherein vertexes of each polygon expands outward with a specific speed according to the height of the respective polygon on the contour map; and
        generating, by the one or more processor, based on the contour map, a geographical map-based visualization of the dataset,
        wherein the generating the geographical map-based visualization of the data set facilitates reduced requirement of resources, to process the datasets on a host device.

2. The method of claim 1, wherein the clustering further comprises clustering using a clustering using representatives (CURE) data clustering algorithm.

3. The method of claim 1, wherein each of the plurality of hierarchical layers includes one or more nodes, wherein each node of the one or more nodes have zero or more child node, and wherein each node contains a sum of data items of the respective zero or more child node thereof.

4. The method of claim 3, wherein
    the graphical representation comprises the one or more circles for the one or more nodes of each layer of the plurality of hierarchical layers, and
    wherein each circle of the one or more circles in the graphical representation corresponds to a respective two-dimensional distribution of data overlaying one or more two-dimensional distributions of data of one or more other circles.

5. The method of claim 1, wherein the displaying further comprises:
    receiving a user input indicative of a number of layers of visualization; and
    displaying the respective one or more representative points for each of the data blocks in the number of layers according to the user input.

6. The method of claim 1, wherein the displaying further comprises displaying the respective one or more representative points for each of the data blocks in a default number of layers.

7. The method of claim 1, wherein the displaying further comprises displaying the respective one or more representative points for each of the data blocks as the geographical map-based visualization of the dataset.

8. The method of claim 1, further comprising:
    determining, for each data item of each data block of the plurality of data blocks, a degree of closeness between the each data item and other data items of the respective data block;
    determining a clustering threshold based at least in part on the degrees of closeness between the data items of a given data block for at least one data block of the plurality of data blocks; and
    determining, for at least two data items of the at least one data block, whether the at least two data items belong to a same class or different classes of data based at least in part on the clustering threshold.

9. The method of claim 1, further comprising:
receiving a user input indicative of a minimum threshold of a size of an amount of data contained in each of the data blocks for visualization.

10. A non-transitory computer-readable storage medium having stored thereon computer-executable instructions executable by one or more processors to perform or control performance of operations comprising:
perform operations related to cluster a random sampling of a dataset, wherein the cluster of the random sampling of the dataset comprises establishment of a tree data structure that have a plurality of hierarchical layers; and
display results of the performed operations as a geographical map-based visualization of the dataset, wherein the operations to display comprises at least one operation to:
generate a normal graph by use of a graphical representation of the tree data structure, by conducting two-dimensional normalization of one or more circles in the graphical representation;
generate a contour map that corresponds to a height of the normal graph;
transform each circle of the one or more circles into a polygon of one hundred sides, wherein vertexes of each polygon expands outward with a specific speed according to the height of the respective polygon on the contour map; and
generate, based on the contour map, the geographical map-based visualization of the dataset,
wherein the generation of the geographical map-based visualization of the data set facilitates reduced requirement of resources, to process the datasets on a host device.

11. The non-transitory computer-readable storage medium of claim 10, wherein to perform the operations related to cluster the random sampling of the dataset, comprises:
perform the random sampling of the dataset to obtain a sample representative of the dataset;
divide the sample into a plurality of partitions;
cluster each partition of the plurality of partitions to provide a plurality of data blocks, wherein each of the plurality of data blocks comprises a respective plurality of data items; and
extract respective one or more representative points from each data block of the plurality of data blocks to represent the respective data block,
wherein the display of the results further comprises display of the respective one or more representative points for each of the data blocks.

12. The non-transitory computer-readable storage medium of claim 10, wherein the operations to cluster comprises at least one operation to cluster using a clustering using representatives (CURE) data clustering algorithm.

13. The non-transitory computer-readable storage medium of claim 11, wherein each of the plurality of hierarchical layers includes one or more nodes, wherein each node of the one or more nodes have zero or more child node, and wherein each node contains a sum of data items of the respective zero or more child node thereof.

14. The non-transitory computer-readable storage medium of claim 13, wherein
the graphical representation comprises the one or more circles for the one or more nodes of each layer of the plurality of hierarchical layers, and
wherein each circle of the one or more circles in the graphical representation corresponds to a respective two-dimensional distribution of data overlaying one or more two-dimensional distributions of data of one or more other circles.

15. The non-transitory computer-readable storage medium of claim 11, wherein the operations to display further comprises at least one operation to:
receive a user input indicative of a number of layers of visualization; and
display the respective one or more representative points for each of the data blocks in the number of layers according to the user input.

16. The non-transitory computer-readable storage medium of claim 11, wherein the operations to display further comprises at least one operation to display the respective one or more representative points for each of the data blocks in a default number of layers.

17. The non-transitory computer-readable storage medium of claim 11, wherein the operations to display further comprises at least one operation to display the respective one or more representative points for each of the data blocks as the geographical map-based visualization.

18. The non-transitory computer-readable storage medium of claim 11, wherein the computer-executable instructions further comprise instructions that, in response to execution, cause the one or more processors to perform at least one operation to:
determine, for each data item of each data block of the plurality of data blocks, a degree of closeness between the each data item and other data items of the respective data block;
determine a clustering threshold based at least in part on the degrees of closeness between the data items of a given data block for at least one data block of the plurality of data blocks; and
determine, for at least two data items of the at least one data block, whether the at least two data items belong to a same class or different classes of data based at least in part on the clustering threshold.

19. The non-transitory computer-readable storage medium of claim 11, wherein the computer-executable instructions further comprise instructions that, in response to execution, cause the one or more processors to perform at least one operation to:
receive a user input indicative of a minimum threshold of a size of an amount of data contained in each of the data blocks for visualization.

20. An apparatus, comprising:
memory configured to store one or more instructions; and
one or more processors coupled to the memory, wherein the one or more processors are configured to execute the one or more instructions to perform or control performance of operations comprising:
perform a random sampling of a dataset to obtain a sample representative of the dataset;
divide the sample into a plurality of partitions;
cluster each partition of the plurality of partitions to provide a plurality of data blocks, wherein each of the plurality of data blocks comprises a respective plurality of data items, and wherein to cluster each partition of the plurality of partitions, the one or more processors are configured to establish a tree data structure that have a plurality of hierarchical layers;
extract respective one or more representative points from each data block of the plurality of data blocks to represent the respective data blocks; and display the respective one or more representative points for each of the data blocks as a geographical map-based visualization of the dataset, wherein the operations to display comprises at least one operation to:

generate a normal graph, by use of a graphical representation of the tree data structure, by conducting two-dimensional normalization of one or more circle in the graphical representation;

generate a contour map that corresponds to a height of the normal graph;

transform each circle of the one or more circles into a polygon of one hundred sides, wherein vertexes of each polygon expands outward with a specific speed according to the height of the respective polygon on the contour map; and generate, based on the contour map, the geographical map-based visualization of the dataset, wherein the generation of the geographical map-based visualization of the data set facilitates reduced requirement of resources to process the datasets on a host device.

21. The apparatus of claim 20, wherein to cluster further comprises clustering using a clustering using representatives (CURE) data clustering algorithm.

22. The apparatus of claim 20, wherein each of the plurality of hierarchical layers includes one or more nodes, wherein each node of the one or more nodes have zero or more child node, and wherein each node contains a sum of data items of the respective zero or more child node thereof.

23. The apparatus of claim 22, wherein
the graphical representation comprises the one or more circles for the one or more nodes of each layer of the plurality of hierarchical layers, and
wherein each circle of the one or more circles in the graphical representation corresponds to a respective two-dimensional distribution of data overlaying one or more two-dimensional distributions of data of one or more other circles.

24. The apparatus of claim 20, wherein, to display the one or more processors perform operations comprising display the respective one or more representative points for each of the data blocks in a default number of layers or in a user-specified number of layers.

25. The apparatus of claim 20, wherein the one or more processors further perform operations comprising:
determine, for each data item of each data block of the plurality of data blocks, a degree of closeness between the each data item and other data items of the respective data block;
determine a clustering threshold based at least in part on the degrees of closeness between the data items of a given data block for at least one data block of the plurality of data blocks;
determine, for at least two data items of the at least one data block, whether the at least two data items belong to a same class or different classes of data based at least in part on the clustering threshold; and
receive a user input indicative of a minimum threshold of a size of an amount of data contained in each of the data blocks for visualization.

* * * * *